J. FLINN.

Improvement in Bed-Bottoms.

No. 5,080. Reissued Oct. 1, 1872.

WITNESSES:

Benj Morison

Wm H. Morison.

INVENTOR:

John Flinn

A.M. PHOTO-LITHOGRAPHIC CO. N.Y. (OSBORNE'S PROCESS.)

UNITED STATES PATENT OFFICE.

JOHN FLINN, OF PHILADELPHIA, PENNSYLVANIA.

IMPROVEMENT IN BED-BOTTOMS.

Specification forming part of Letters Patent No. 56,740, dated July 31, 1866; reissue No. 5,080, dated October 1, 1872.

*To all whom it may concern:*

Be it known that I, JOHN FLINN, of the city of Philadelphia, in the State of Pennsylvania, have invented certain Improvements in Bed-Bottoms, of which the following is a specification:

My invention relates to an improved mode of extending and bending the wire of the smaller end of the inverted conical spiral spring, so as to produce at the said end a spring-clamp, whereby the said spiral spring will be firmly and detachably supported in an upright position, upon its smaller end, when applied to the usual horizontal slat of the bedstead.

Figure 1:
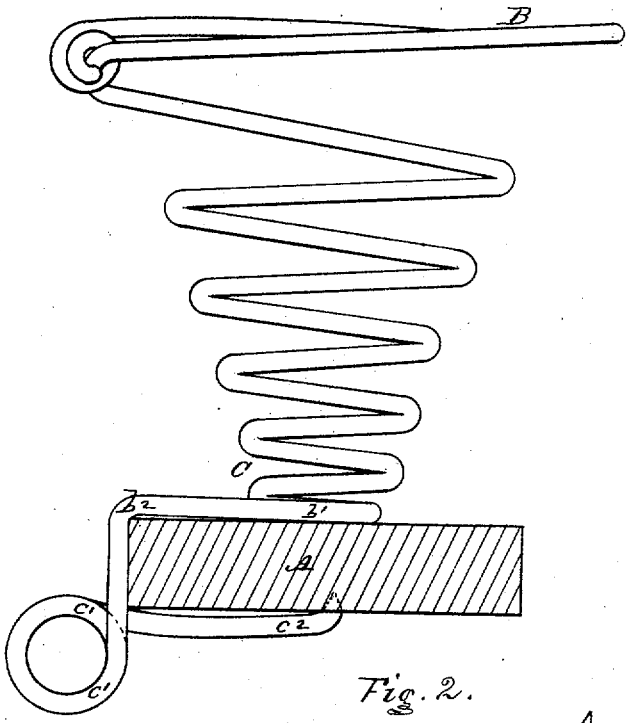
Figure 2:
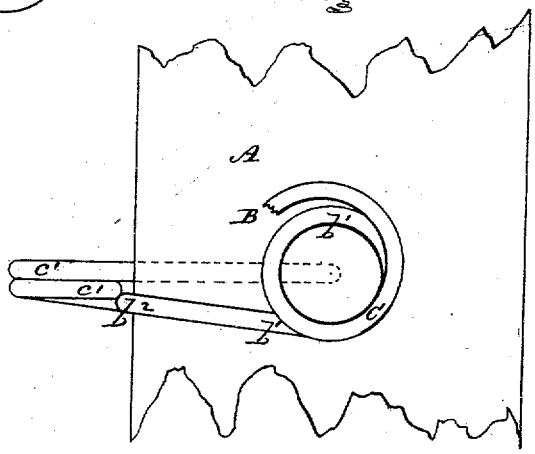

Figure 1 is an elevation, and Fig. 2 a sectional plan view, of my improved spring applied to the slat of a bedstead.

The spiral spring B C is made in the well-known form of an inverted conical frustum, its smallest or bottom coil, $b^1$, being the base upon which it rests when the spring is applied to the slat A; but, instead of carrying the end of the wire to the center of the coil $b^1$, and then bending it vertically downward, so as to produce a straight stem, whereby the said spring may be supported in an upright position, with the said stem in an appropriate hole made through the slat for the purpose, I carry the wire horizontally outward to the length of an inch, more or less, from the said coil $b^1$ and thereat ($b^2$)—bend it downward to a right angle with the horizontal portion, and at the distance of an inch and a half, more or less, I bend the wire outward into one or two vertical coils, $c'$ $c'$, and finally extend it horizontally inward so as to bring it directly under the center of the coil $b^1$, and cut it off at $c''$, and turn this extreme end slightly upward so as to cause it to bear firmly or strongly against the under side of the slat A when the spring B C is applied thereto, thus producing a strong clamping action upon the said slat, holding the spring A securely upon the same without requiring any hole to be bored in the latter, or any notching or cutting whatever to be made in the same to keep the spring in place, and at the same time allowing the said spring to be removed or adjusted to any part of the length of the slat. The clamping power may be readily increased or diminished to suit the required grasp upon the slat by simply bending the lower arm of the clamp so as to bring the end thereof nearer to or further from the coil $b^1$.

It will be readily understood, without any further description or explanation, that, as the coil $b^1$ forms the supporting-base of the spring B C, and also the bearing of the upper jaw of the clamp, while the part ending at $c''$, forms the bearing of the lower jaw of the same, the said spring will be securely supported in its proper upright position and without any liability to tipping or displacement thereon in use; and that the application of the said spring to the slat does not require any boring, notching or other cutting in the latter for the purpose.

The end $c''$ of the wire may be pointed, as indicated in Fig. 1, so as to indent the slat; but, as the the clamp will keep its original position upon the slat without any indentation therein whatever, the pointing of the said end $c''$ is not necessary.

I claim as my invention—

A bed-bottom spring, B C, having the wire of its lower or supporting end, $b^1$, extended and bent so as to produce a spring-clamp for supporting and maintaining in place the said spring upon the slat A, substantially as hereinbefore described and set forth.

Witnesses: JOHN FLINN.

BENJ. MORISON,

WM. H. MORISON.